(12) United States Patent
Aksela et al.

(10) Patent No.: US 11,606,368 B2
(45) Date of Patent: Mar. 14, 2023

(54) THREAT CONTROL METHOD AND SYSTEM

(71) Applicant: F-Secure Corporation, Helsinki (FI)

(72) Inventors: Matti Aksela, Kirkkonummi (FI); Mika Stahlberg, Kauniainen (FI)

(73) Assignee: Withsecure Corporation, Helsinki (FI)

( * ) Notice: Subject to any disclaimer, the term of this patent is extended or adjusted under 35 U.S.C. 154(b) by 540 days.

(21) Appl. No.: 16/679,980

(22) Filed: Nov. 11, 2019

(65) Prior Publication Data
US 2020/0153843 A1    May 14, 2020

(30) Foreign Application Priority Data

Nov. 14, 2018 (GB) ...................... 1818551

(51) Int. Cl.
  *H04L 29/06* (2006.01)
  *G06N 20/00* (2019.01)
  *H04L 9/40* (2022.01)
(52) U.S. Cl.
  CPC ......... *H04L 63/1416* (2013.01); *G06N 20/00* (2019.01); *H04L 63/02* (2013.01); *H04L 63/145* (2013.01)
(58) Field of Classification Search
  CPC ... H04L 63/1416; H04L 63/02; H04L 63/145; G06N 20/00
  See application file for complete search history.

(56) References Cited

U.S. PATENT DOCUMENTS

| | | | |
|---|---|---|---|
| 6,742,124 B1 * | 5/2004 | Kilpatrick | ........... H04L 63/1416 726/23 |
| 9,860,276 B2 * | 1/2018 | Crane | ..................... H04L 67/10 |
| 10,542,046 B2 * | 1/2020 | Katragadda | ............. H04L 63/20 |
| 2008/0148398 A1 * | 6/2008 | Mezack | ................ G06F 21/552 709/224 |

(Continued)

FOREIGN PATENT DOCUMENTS

| | | | | |
|---|---|---|---|---|
| WO | WO 2017/102088 A1 | 6/2017 | | |
| WO | WO-2017102088 A1 * | 6/2017 | ............. | G06F 21/55 |
| WO | WO-2019015615 A1 * | 1/2019 | | |

OTHER PUBLICATIONS

Bitam et al., "Bio-Inspired Cybersecurity for Wireless Sensor Networks", IEEE Communications Magazine, Jun. 2016, pp. 1-7.

*Primary Examiner* — Kambiz Zand
*Assistant Examiner* — Afaq Ali
(74) *Attorney, Agent, or Firm* — Harrington & Smith

(57) ABSTRACT

A method including: establishing an internal swarm intelligence network including security agent modules of a plurality of interconnected network nodes of a local computer network, collecting data related to the respective network nodes, sharing information based on the collected data in the established internal swarm intelligence network, and using the collected data and information received from the internal swarm intelligence network for generating and adapting models related to the respective network node nodes. In case a new threat is identified, the threat is verified and contained, a new threat model is generated and the generated new threat (Continued)

model is shared. The security alert and/or the generated new threat model is transmitted to a security service network for enabling the security service network to share the received security alert and/or the new threat model.

15 Claims, 3 Drawing Sheets

(56) References Cited

U.S. PATENT DOCUMENTS

| | | | | |
|---|---|---|---|---|
| 2013/0198840 A1* | 8/2013 | Drissi | ................... | G06F 21/552 |
| | | | | 726/22 |
| 2017/0289179 A1* | 10/2017 | Dubuc | ................... | G06F 21/552 |
| 2018/0004942 A1* | 1/2018 | Martin | ................... | G06F 21/554 |
| 2019/0007447 A1* | 1/2019 | Barnes | ................... | H04L 63/306 |
| 2019/0386957 A1* | 12/2019 | Leon | ................... | H04L 63/0876 |

* cited by examiner

THREAT CONTROL METHOD AND SYSTEM

TECHNICAL FIELD

The present invention relates to a method of threat control in a computer network security system and to a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond and/or take automated action. The growth of EDR has been made possible in part by the emergence of machine learning, big data and cloud computing.

Traditional EDR or other similar systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

Data volumes and threat surfaces expand at enormous rates. As threats against the computer systems can be tailored at rapid rates, also security models against the threats need to evolve. It will not be possible to keep up with ever increasing cyber threats, both file-based and file-less, by using present "simple" endpoint protection methods nor purely by enhancing the capabilities of the cloud and backend. However, smarter endpoints also pose multiple problems in terms of vulnerability and increasing also capabilities and data privacy requirements. Thus, traditional means simply cannot address the speed of change and variety of situations encountered.

There exists prior solutions, such as F-Secure's® real time protection network (ORSP) and Immunet®, aiming to solve these problems with cloud-based approaches. These are based on traditional signatures stored in the cloud which is queried by end points. Thus, when a threat is detected and blocked for one user, all other users receive the same protection. However, these solutions don't offer the best possible protection for each device with evolving threats, for example in situations where the attacks can be targeted and novel for each system, nor is a fully centralized processing approach very effective with ever increasing data volumes, and thus solutions offering better and more effective protection are needed.

There is a need for improved computer network security systems that are able to deal with attacks that are difficult to detect with traditional methods both now and in the future. There is also a need to reduce problems related to following areas: cost of doing purely backend processing with ever-growing amount of data, privacy concerns when all data is required to be sent to backend, key security issues of security model stealing and model misleading on a mass scale due to individualized local models, challenges in sharing learnt information due to complexity of the learning processes, accuracy of models that are generated on a global scale, sharing local learnings while maintaining confidentiality of customer systems, finding most appropriate preventive measures, incorporating human expert guidance to an AI driven process, ensuring that the AI process does not learn in unwanted directions when not controlled, adapting to ever-changing threat landscape.

SUMMARY

According to a first aspect of the invention there is provided a method of threat control as specified in claim 1.

According to a second aspect of the invention, there is provided a system as specified in claim 14.

According to a third aspect of the invention, there is provided a computer network security system as specified in claim 15.

According to a fourth aspect of the invention, there is provided a computer program comprising computer readable code which, when run on multiple computer systems or servers, causes the computer systems or servers to act as computer systems or servers according to claims 14 and 15.

According to a fifth aspect of the invention, there is provided a computer program product comprising a non-transitory computer readable storage medium and a computer program according to claim 16, wherein the computer program is stored on the computer readable medium according to claim 17.

DETAILED DESCRIPTION

Figure 1:
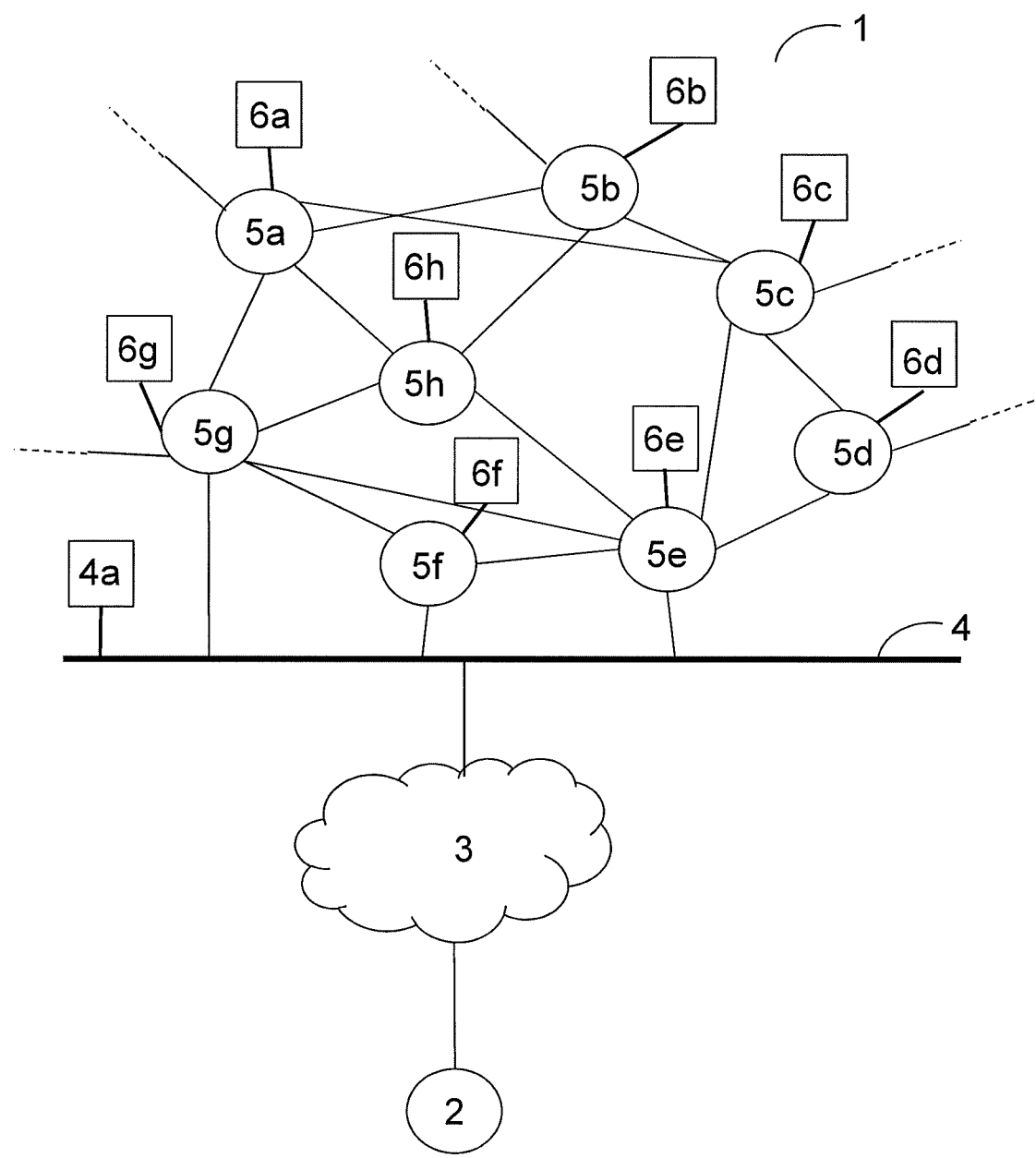
FIG. 1 illustrates schematically a network architecture.

FIG. 1 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to a security service network, here security backend/server 2 through the cloud 3. The backend/server 2 forms a node on the security service computer network relative to the first computer network. The security service computer network is managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also envisaged.

The first computer network 1 is formed of a plurality of interconnected network nodes 5a-5h, each representing an element in the computer network 1 such as a computer, smartphone, tablet, laptop, or other piece of network enabled hardware. Each network node 5a-5h shown in the computer network also represents an EDR endpoint onto which a security agent module 6a-6h, that may include a data collector or "sensor", is installed. Security agent modules may also be installed on any other element of the computer network, such as on the gateway or other interface. A security agent module 4a has been installed on the gateway 4 in FIG. 1. The security agent modules, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

The data collected may be stored in a database or similar model for information storage for further use. Any kind of behaviour profiles/representations of behaviours of applications/services/processes may further be constructed at the nodes 5a-5h by a security application, at the backend/server 2, and/or at a second server and be stored in the database. The nodes 5a-5h and the server 2 typically comprise a hard drive, a processor, and RAM.

It is envisaged that any type of data which can assist in detecting and monitoring a security threat, such as a security breach or intrusion into the system, may be collected by the security agent modules 6a-6h, 4a during their lifecycle and that the types of data which are observed and collected may be set according to rules defined by the EDR system provider upon installation of the EDR system or in response to instructions from the EDR backend 2. In an embodiment of the present invention, at least part of the security agent modules 6a-6h may also have capabilities to make decisions on the types of data observed and collected themselves. For example, the security agents 6a-6h, 4a may collect data about the behaviour of programs running on an EDR endpoint and can observe when new programs are started. Where suitable resources are available, the collected data may be stored permanently or temporarily by the security agent modules 6a-6h, 4a at their respective network nodes or at a suitable storage location on the first computer network 1 (not shown).

The security agent modules 6a-6h, 4a are set up such that they send information such as the data they have collected or send and receive instructions to/from the EDR backend 2 through the cloud 3. This allows the EDR system provider to remotely manage the EDR system without having to maintain a constant human presence at the organisation which administers the first computer network 1.

According to the present invention, the security agent modules 6a-6h, 4a are also configured to establish an internal swarm intelligence network that comprises the security agent modules of the plurality of interconnected network nodes 5a-5h of the local computer network 1. As the security agent modules 6a-6h, 4a collect data related to the respective network nodes 5a-5h of each security agent module 6a-6h, 4a, they are further configured to share information that is based on the collected data in the established internal swarm intelligence network. The swarm intelligence network is comprised of multiple semi-independent security nodes (security agent modules) which are capable of functioning on their own as well. Thus, the numbers of instances in a swarm may well vary. There may also be more than one connected swarms in one local computer network, which collaborate with one another.

The security agent modules 6a-6h, 4a are further configured to use the collected data and information received from the internal swarm intelligence network for generating and adapting models related to the respective network node 5a-5h. For example, in case a known security threat is detected, the security agent module 6a-6h, 4a is configured to generate and send a security alert to the internal swarm intelligence network and to a local centre node (not shown) in the local computer network and to activate security measures for responding to the detected security threat. Further, in case an anomaly that is estimated very likely to be a new threat is identified, the security agent module 6a-6h, 4a is configured to verify and contain the threat, generate a new threat model on the basis of the collected data and received information and share the generated new threat model in the internal swarm intelligence network and the local centre node.

Figure 2:
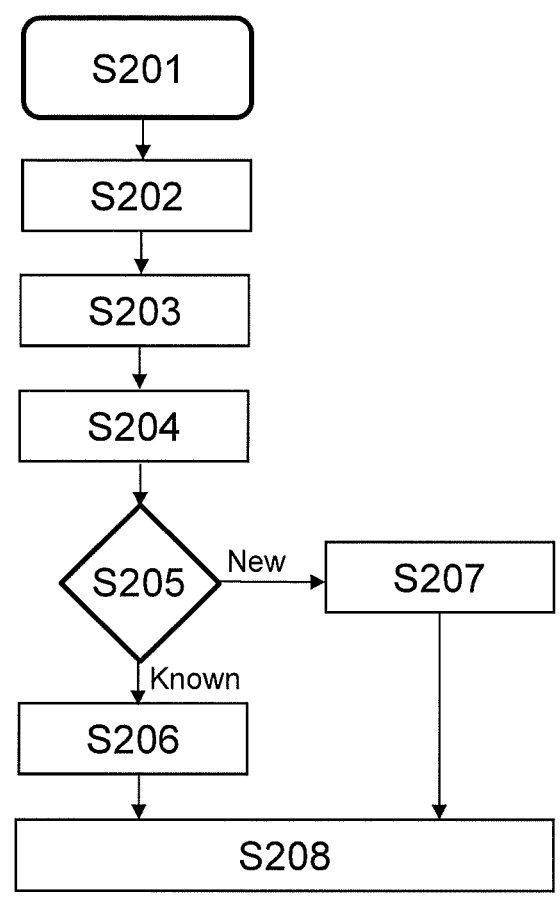
FIG. 2 is a flow diagram illustrating a method according to an embodiment.

FIG. 2 is a flow diagram illustrating an example of a threat control method according to an embodiment.

In S201, an internal swarm intelligence network comprising security agent modules of a plurality of interconnected network nodes of a local computer network is established.

In S202, the one or more security agent modules collect data related to the respective network node of the security agent module. Data may be collected from the plurality of network nodes by using various kinds of endpoint sensors. The collected data blocks may be referred to as events. In an embodiment, monitoring the behaviour of the first suspicious event and any related events may comprise monitoring the behaviour of a computer process and any child processes thereof. In most cases much of the data collected is in fact not of suspicious origin, but since the system should be careful to aim to notice all malicious activity, monitoring and data collection may always remain active. However it is possible to adjust the granularity of data collection, either from the centralized location or by the sensors themselves on the basis of noticing something of interest.

In S203, information based on the collected data is shared in the established internal swarm intelligence network. In an embodiment, the amount of information exchanged between any two of the security agent modules in the internal swarm intelligence network may be larger between the security agent modules locating close to one another than between the security agent modules locating further apart from one another. The information referred to may be for example aggregate information, identification of noticed suspicious processes/users/hosts/events or similar.

In S204, the collected data and information received from the internal swarm intelligence network is used, at the security agent modules, for generating and adapting models related to the respective network node. The adaptive models may for example be configured to learn the local behaviour on the respective host which allows the establishment of a more granular understanding of normal behaviour in that node and hence easier detection of anomalies. When the adaption is done locally, it can be much more efficient and faster to react to changes if needed. In an embodiment, the models used by the security agent modules that are located close to one another may be more similar in behaviour when compared to those located further away as a consequence of the more intense information sharing. The distance between the modules is not necessarily a physical distance, but communication intensity based shared localization, for example.

In S205, in case a known security threat is detected, S206 is entered where a security alert is generated by the security agent and then sent to the internal swarm intelligence network and to a local centre node in the local computer network. Further any security measures for responding to the detected security threat may be activated.

If, in S205, a new threat is identified, then S207 is entered where the threat is verified and contained by the security agent module and a new threat model is generated on the basis of the collected data and received information. Examples of such models could be automatically generated detection rules or probabilistic models trained on the event/behavioural data on that node to identify events similar to the newly observed threat. Further, the generated new threat model is shared in the internal swarm intelligence network and with the local centre node to allow all nodes to detect similar threats in a privacy-sensitive manner.

In an embodiment, the security agent modules are able to activate one or more components of their modular architecture and to replicate themselves. Further, in case any of the security agent modules detects the need for further resources for managing the detected security threat or for analysis of the suspected security threat, the security agent modules may request resources from other security agent modules or even generate new virtual security agent modules.

In an embodiment, the security agent modules use sandboxing techniques for determining a remedy for the detected security threat and/or further analysing the behaviour of potentially malicious entities. The sandboxing can be utilized to execute suspicious code or actions in an environment where the outcome can be observed and the validity of the threat established.

In an embodiment, a suspicious event among the monitored events may be detected by one or more detection mechanisms used. In an embodiment, the detection mechanisms used to detect the suspicious event may comprise using at least one of: a machine learning models, a scanning engine, a heuristic rule, a statistical anomaly detection, fuzzy logic based models, any predetermined rules.

In an embodiment, the method may further comprise training machine learning models used in the detection of threats and/or as a response to threats by utilizing one or more following approaches used for training machine learning models: distributed Teaming via combining local and global information and model parts, reinforcement learning via getting feedback on successful end results, meta-learning via utilizing external information in the learning process; and/or information sharing to bootstrap models and adjust learning behaviour.

In an embodiment, one or more meta-learning models are used to generate the new threat detection model, action model and/or response model and only higher-level representations of the learned information is shared in the internal swarm intelligence network and with the local centre node. Further, for example event abstractions may be built of the collected data for enabling the use of data across exact data set, device and version.

In an embodiment, information on alerts, statuses and other relevant entities are shared by using at least one language model for enabling the information to be interpretable by both computer systems and human experts.

In S208, the security alert and/or the generated new threat model is transmitted from the local centre node to a security service network for enabling the security service network to share the received security alert and/or the new threat model with other local computer networks and to take further action on the basis of the received security alert and the new threat detection model. In an embodiment, partial or full sets of information for cross-local-network learning in a privacy preserving manner is transmitted between the local centre node and the security service network.

Further, the security agent modules are configured to receive instruction from the security service network to evolve the behaviour of the security agent module for detection of and/or responding to the security threats. For example, guidance related to detections and/or response actions may be received, at the security agent modules, from human experts in a language model that is close to human language for allowing interaction between the human security experts and the security agent modules.

In an embodiment, further actions may be taken to secure the computer network and/or any related network node when a threat has been detected, such as taking immediate action by changing the settings of the network nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a breach has been detected and that their workstation is under investigation, and/or a system update or software patch may be sent from the EDR backend 2 to the nodes in response to detecting a sign of a breach. It is envisaged that one or more of these actions may be initiated automatically by the above-described models or algorithms. For example, using the above described methods, data has been collected and shared with the nodes in the computer network 1 and the EDR backend 2 and a threat model or an analysis algorithm has determined that a sign of a breach was detected. As soon as the model/algorithm makes the determination that a sign of a breach was detected, it may generate and issue a command to the related network nodes without human intervention to automatically initiate one or more of the above-described actions at the nodes. By doing this, a breach can be stopped and/or the damage minimised automatically at very high speeds and without human intervention.

Figure 3:
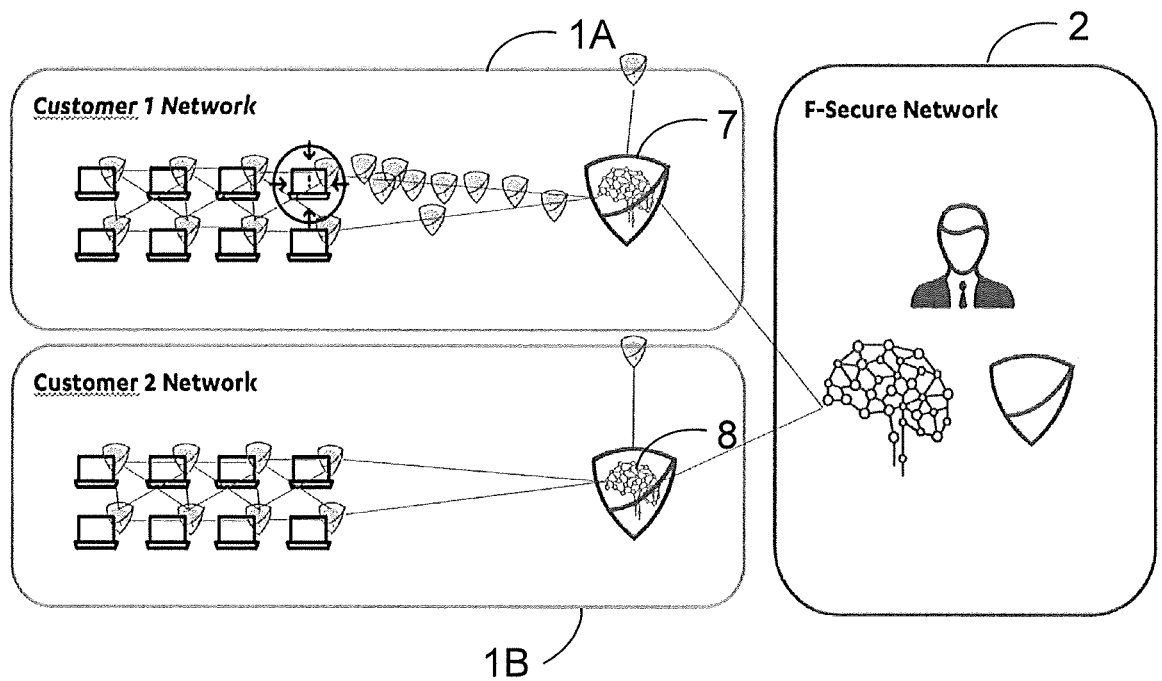
FIG. 3 illustrates an example of computer network system according to an embodiment.

FIG. 3 illustrates a high-level concept of an embodiment according to the invention. FIG. 3 example shows two local computer networks 1A, 1B, and a security service network 2, wherein each local computer network 1A, 1B further comprises a local centre node 7, 8 and a plurality of interconnected network nodes and a security agent module in each of the plurality of network nodes. The security agent modules are configured to establish an internal swarm intelligence network in each local computer network.

Figure 4:
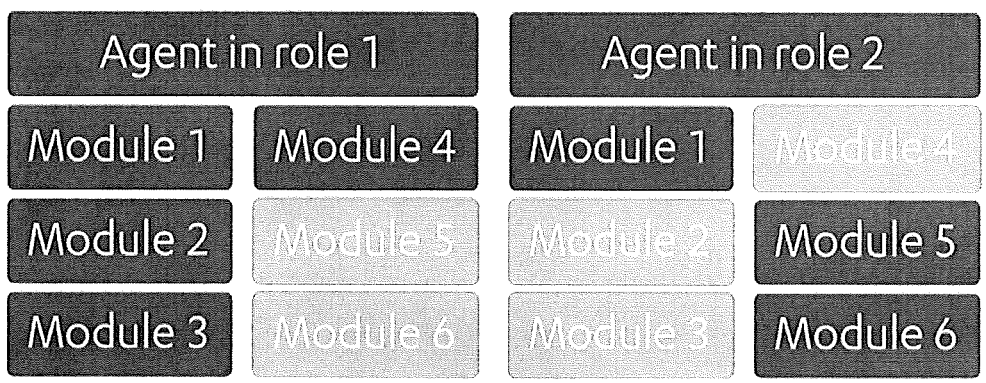
FIG. 4 illustrates an example of a modular structure of security agents according to an embodiment.

In an example normal mode of operation, the agent's deployment structure consists of on average one agent residing on one endpoint, together with a local communications node and information aggregation centre (local centre node 7,8). In an embodiment, as illustrated in FIG. 4, the security agents may be built such that at least some of their functionalities are inactive even if present thereby allowing for replication of new agents also into different roles than the original host has.

This kind of approach would enable increased flexibility and resilience across different roles. Additional features of key importance may be dynamic upgradeability of components and evolutionary improvement of functionality, where the most effective components are distributed across the nodes of the swarm and also to the central location. The central location may hold an authenticated and secure channel towards the agents, thus allowing instruction and shared learning.

Next, components of the proposed model are described as practical implementation examples:

1. The use of a swarm-type approach of multiple connected and interacting network nodes that may have the capability to replicate themselves if needed
   Traditionally it has been common to assume that a large amount of the intelligence is required to be centralized or have "strong" agents, but a more effective solution may be individual agents that are well equipped but also somewhat less holistic in their own capabilities and that are able to benefit from the interoperation between the agents. The lack of trying to encode everything into a fully replicated model enables having models protected against generic model stealing and aversion type of attacks as the response from all nodes in the swarm would not be the same and hence even if an aversion technique was successful on one node, it would not be expected to be generalized across all nodes.

However, the nodes should be highly connected and share information, both within the swarm located in one customer premises (where information sharing is essentially fully open) also to nodes outside of the customer premises due to the central host (to allow for cross-customer learning). This information sharing may include data, but also learnings in terms of, for example, incremental model additions or specific sub-models facing a certain part of possible threats and may be communicated in the proposed language model used for communication.

A much deeper collaboration between the nodes of the network that are closer to one another, or the agents working "near" each other (as measured for example by the amount of information shared between their locations), or agents being more similar in terms of their outputs and learning, than those further away resulting in local variations of parameters and operations allowing for not just node-specific agent adaption, but organization-specific and possibly team, office, etc. specific, too—all without the need to explicitly define the organizational relationships.

2. The use of distributed reinforcement learning with meta-learning, world models and information sharing Traditional reinforcement learning models suffer from severe challenges in requiring a huge amount of data to learn, as they usually do not utilize much prior knowledge. Here it is proposed to use meta-learning models (learning how to learn), encoding information on the surrounding world (possibly through probabilistic state models or similar approaches) and suitable methods for information sharing across the nodes. This can be seen as a federated transfer learning type of scenario as well, but the key is not to share the full models nor mere increments of a learned model, as both are not only inefficient but also prone to attacks, but higher-level representations of the learnt information that can be applied locally. In an example of the reinforcement learning the implementing technology may, or may not, be based on deep learning. It may as well be almost any other type of machine learning model found suitable. However, the core is in the concept of how to learn and how to share learning.

3. The use of language models that are shared by both the AI and human experts for information sharing In an embodiment, encoding information that can be used for training models in a language-like form may be used. However, this may be taken one step further and used as a means for communication and guidance sharing between the AI and experts. Instead of learning just by receiving code or data, or learning from actions, the AI may share information in the form of sentence-like descriptions which can be interpretable by both AI and expert alike. Examples of using the way of sharing guidance may be an expert making a decision to instruct an AI driven agent to contain a node which is exhibiting anomalous behaviour even if a validated threat detection has not yet been made.

4. The use of purpose-based learning with rules of engagement to avoid undesired behaviour Another major challenge to having models, even and perhaps especially in reinforcement learning type scenarios, properly learn in varying situations has been the formulation of reward functions, and the possible unwanted behaviour that may arise from an overly simplistic but effective reward model. In an embodiment, this is proposed to be circumvented by high-level purpose driven reward models with smaller sub-components to be modelled on the intended state (no intrusions) as well as benefit from positive actions, and to be abstracted to a level that can be applied across systems. Furthermore, rules of engagement may dictate what actions can be taken by each agent and in what situation to override possible conflicts.

5. Encoding multiple domains of information into event abstractions for transferability A final critical component hindering the use of such systems has been the complexity and variability of data. The proposed solution according to an embodiment may revolve around building event abstractions of the information so that they can be used across exact data set, device and version. Abstractions may also be constructed from data and learnt and updated such a way that they will remain up-to-date and usable, including a human interpretable component.

Next practical example steps of an operation according to an embodiment will be described.

Deployment: As all agents may fundamentally have the same code base and ability to adapt to their role by activating different components in their modular architecture and replicate themselves, one would merely need to deploy one initial agent in a customer network with sufficient access rights, which would then discover servers and install copies of itself in the suitable locations and establish the swarm internal communications network as well as the backend update, reporting and communication channel. In addition, authentication and other required issues may need to be considered, and in first incarnations agents may be deployed on individual hosts.

Normal operation: The agents continuously monitor their environment and collect data, learning from what they see and build models of their hosts and their surroundings. These models may be shared across swarm nodes and used for learning, for example of users' behaviour on one computer vs. others in the network. Additionally, abstract information may be sent to the backend in a privacy preserving way. The agents utilize the abovementioned learning models to be prepared also for knowing what is normal.

Encountering a known threat: The agents detecting either a known threat or an anomaly indicating a known threat may instantly alert their swarm mates of the situation, also to prepare for threats that may deactivate them, and call for additional resources if needed (spin up new virtual agents or have them delivered from another host if there is risk of compromise). If the agent already has the means for response, that action may be taken. Encountering a novel threat: The agents, due to constantly learning what is normal and in a very granular manned due to their specificity with the data of their own nodes, are also equipped to detect novel threats. Their ability to interact with the users will be used to verify the threat, and if the threat is verified, take actions to contain it as well as build a new threat model that will be circulated, in the known language, to both swarm mates and also other customers through the central link. In some embodiments, the risk of the threat may be determined to be so great that autonomous containment actions may also be taken before awaiting a final decision. The degree of autonomous actions can always be adjusted as needed. The connectivity model also allows for the help of human experts to be called upon if needed.

Neutralizing a novel threat: The agents may also contain sandbox capabilities, which could be utilized for a safe environment and also containment, allowing for the use of evolutionary approaches for detecting how to neutralize the novel threat (try—evaluate—mutate—try again) as well as understanding the behaviour of such threats in much greater detail and further conveying that information.

Sharing new threat knowledge: as new threats are identified, they are encoded into the internal language representation for sharing across agents, centrally and therefrom also to other customers to ensure optimal protection of all customers in a privacy preserving manner.

Backend preparation: Constantly during operation, the information on both events and threats can be abstracted and sent to the backend. This enables a backend "laboratory" to continue experimentation on more effective defence tools in a secure (sandbox-like) environment as well as provides further correlation and analysis of the data sent from the multitude of individual intelligent sensors.

Thus the described model is essentially a new way to implement cyber security solutions in a distributed and adaptive but still co-operational manner across platforms, threats and scenarios. The next generation of a cyber security solution may thus be comprised of autonomous, interactive and localized AI agent swarms, and this is an example of an approach to reach that state.

An embodiment of the invention enables a solution of how not only create and deploy a multitude of adaptive network nodes, but also to make it possible for the nodes to share information and instructions among themselves as well as with the backend, where human experts may add insights and interpret findings in a way that is locally more precise but still contains also a global aspect.

In an embodiment of the invention, a swarm-type approach of multiple connected and interacting nodes that may have the capability to replicate themselves if needed is used. In an embodiment, distributed reinforcement learning with meta-learning, world models and information sharing is used. Further, language models that are shared by both the AI and human experts for information sharing may be utilized. In an embodiment, purpose-based learning with rules of engagement to avoid undesired behaviour is used. In an embodiment, multiple domains of information may be encoded into event abstractions for enabling transferability.

Generally, the proposed approach introduces number of improvements to conventional solutions. Such improvements comprise, for example, enabling shared learning with minimal data transfer as well as human-understandable mean of communicating with the AI (language model). This in turn enables learning not only from data based on what has been seen but also learning between AI agents and also from the human experts in an interactive model that produces essentially true next generation dynamically adaptive swarm artificial intelligence based EPP and/or EDR solution.

Another improvement according to an embodiment is that by performing more actions on the client endpoints, cost of doing purely backend processing with ever-growing amounts of data is reduced. Further, by sending only data that is needed and often in an abstracted form, privacy concerns can be reduced. Further, key security issues of model stealing and model misleading on a mass scale can be avoided due to using individualized local models: same mistakes are not learned and all the models are not the same. Further, sharing abstractions and bootstrapping information instead of increments or full models helps reducing challenges in sharing learnt information that are caused by the complexity of the learning processes.

Further improvement according to an embodiment is that the accuracy of models generated can be optimized for local performance due to using local learning of patterns specific to the customer/host. Further, local learnings can be shared in a more general fashion across customers while maintaining confidentiality of customer systems due to abstractions of learnings used. Further improvement is also the ability to find the most appropriate preventive measures by using evolutionary approaches to prevention.

Another improvement in an embodiment is that human expert guidance can be incorporated into an AI driven process by using language model—based abstractions in addition to data sharing. Further, it can be ensured that the AI process does not learn in undesired directions when not controlled by using rules of engagement to control actions. Further improvement is that the ever-changing threat landscape can be adapted to by dynamic learning and global use of information.

As described above, the nature of the model used by the system (e.g. EDR) may be, or may incorporate elements, from one or more of the following: a neural network trained using a training data set, exact or heuristic rules (e.g. hardcoded logic), fuzzy logic based modelling, and statistical inference based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims.

The invention claimed is:
1. A method of threat control, the method comprising:
establishing an internal swarm intelligence network comprising security agent modules of a plurality of interconnected network nodes of a local computer network, wherein each of the security agent modules have a modular architecture and configured
to activate one or more components of their modular architecture
to replicate into different roles, and
to monitor a respective local network and a respective network node of the plurality of interconnected network nodes for building a local model,
wherein the activated one or more components of each of the security agent modules are defined by their roles,
the method further comprising, at the one or more security agent modules:
collecting data related to the respective network node of the security agent module;
sharing information based on the collected data in the established internal swarm intelligence network across the security agent modules;

using the collected data and information received from the internal swarm intelligence network for generating and adapting local models related to the respective network node, wherein the local models are optimized for local performance at the respective local network by using local learning of patterns specific to the respective local network or local learning of patterns specific to the respective network node;

in case a known security threat is detected, generating and sending a security alert to the internal swarm intelligence network and to a local centre node in the local computer network and activating security measures for responding to the detected security threat;

in case a new threat is identified, verifying and containing the threat, generating a new threat model on the basis of the collected data and received information and sharing the generated new threat model in the internal swarm intelligence network and the local centre node; the method further comprising:

transmitting abstract information of the security alert and/or the generated new threat model from the local centre node to a security service network for enabling the security service network to share the received security alert and/or the new threat model with other local computer networks and to take further action on the basis of the received security alert and the new threat model; and receiving instruction, at the local centre node, from the security service network to evolve the behaviour of the one or more security agent modules for detection of and/or responding to such security threats.

2. The method according to claim 1, wherein the amount of information exchanged between any two of the security agent modules in the internal swarm intelligence network is larger between the security agent modules locating close to one another than between the security agent modules locating further from one another.

3. The method according to claim 2, wherein the local models used by the security agent modules that are located close to one another are more similar in behaviour to those located further away as a consequence of more intense information sharing.

4. The method according to claim 1, wherein a detection mechanism is used to detect security threats, and comprises using at least one of: a machine learning models, a scanning engine, a heuristic rule, a statistical anomaly detection, fuzzy logic based models, predetermined rules.

5. The method according to claim 1, further comprising using one or more meta-learning models defining how learning is performed for generating the new threat, action or response model and sharing only higher-level representations of learned information in the internal swarm intelligence network and with the local centre node.

6. The method according to claim 1, further comprising sharing information on alerts, statuses and other relevant entities by using at least one language model for enabling the information to be interpretable by both computer systems and human experts.

7. The method according to claim 1, further comprising receiving, at the security agent module, guidance related to detections and/or response actions from human experts in a language model that is close to human language for allowing interaction between the human security experts and the security agent modules.

8. The method according to claim 1, further comprising building event abstractions of the collected data for enabling the use of data across exact data set, device and version.

9. The method according to claim 1, in case any of the security agent modules detects the need for further resources for managing the detected security threat, the method further comprises requesting resources from other security agent modules or generating new virtual security agent modules.

10. The method according to claim 1, wherein the security agent modules are further configured to use sandboxing techniques for determining a remedy for the detected security threat and/or further analysing the behaviour of potentially malicious entities.

11. The method according to claim 1, further comprising: taking further action to secure the computer network and/or any related network node, wherein the further action comprises any one or more of:

preventing one or more of the network nodes from being switched off;
switching on a firewall at one or more of the network nodes;
slowing down or blocking network connectivity of one or more of the network nodes;
removing or placing into quarantine suspicious files;
collecting logs from network nodes;
executing sets of command on network nodes;
warning a user of one or more of the network nodes that signs of a security threat have been detected; and/or
sending a software update to one or more of the network nodes.

12. The method according to claim 1, further comprising training machine learning models used in the detection of threats and/or as a response to threats by utilizing one or more following approaches for training machine learning models:

distributed learning via combining local and global information and model parts;
reinforcement learning via getting feedback on successful end results;
meta-learning via utilizing external information in the learning process; and/or
information sharing to bootstrap models and adjust learning behavior.

13. A system comprising:

a local centre node, a plurality of interconnected network nodes and a security agent module in each of the plurality of network nodes, wherein the system is configured to establish an internal swarm intelligence network in a local computer network, wherein each of the security agent modules have a modular architecture and configured
to activate one or more components of their modular architecture
to replicate into different roles, and
to monitor a respective local network and a respective network node of the plurality of network nodes for building a local model,
wherein the activated one or more components of each of the security agent modules are defined by their roles, and wherein the system is further configured to:
collect data related to the respective network node of the security agent module;
share information based on the collected data in the established internal swarm intelligence network across the security agent modules;
use the collected data and information received from the internal swarm intelligence network for generating and adapting artificial intelligence models related to the respective network node, wherein the local models are optimized for local performance at the respective local network by using local learning of patterns specific to the respective local network or local learning of patterns specific to the respective network node;

in case a known security threat is detected, generate and send a security alert to the internal swarm intelligence network and to the local centre node in the local computer network and activate security measures for responding to the detected security threat; and in case a new threat is identified, verify and contain the threat, generate a new threat model on the basis of the collected data and received information and share the generated new threat model in the internal swarm intelligence network and the local centre node; and wherein the system is configured to transmit abstract information of the security alert and/or the generated new threat model from the local centre node to a security service network for enabling the security service network to share the received security alert and/or the new threat model with other local computer networks and to take further action on the basis of the received security alert and the new threat model; and the system is further configured to receive instruction from the security service network to evolve the behaviour of the one or more security agent modules for detection of and/or responding to such security threats.

14. A computer network security system comprising:
one or more local computer networks; and
a security service network, wherein each local computer network further comprises:
a local centre node, a plurality of interconnected network nodes and a security agent module in each of the plurality of network nodes, wherein the computer network security system is configured to establish an internal swarm intelligence network in the local computer network, wherein each of the security agent modules have a modular architecture and configured
to activate one or more components of their modular architecture
to replicate,
to monitor a respective local network and a respective network node of the plurality of network nodes for building a local model, wherein the activated one or more components of each of the security agent modules are defined by their roles, and wherein the computer network security system is further configured to: collect data related to the respective network node of the security agent module, share information based on the collected data in the established internal swarm intelligence network across the security agent modules, use the collected data and information received from the internal swarm intelligence network for generating and adapting models related to the respective network node, wherein the models are optimized for local performance at the respective local network by using local learning of patterns specific to the respective local network or local learning of patterns specific to the respective network node, and in case a known security threat is detected, generate and send a security alert to the internal swarm intelligence network and to the local centre node in the respective local computer network and activate security measures for responding to the detected security threat; and in case a new threat is identified, verify and contain the threat, generate a new threat model on the basis of the collected data and received information and share the generated new threat model in the internal swarm intelligence network and the local centre node; and wherein the computer network security system is configured to transmit abstract information of the security alert and/or the generated new threat model to the security service network;

the security service network is configured to share the received security alert and/or the new threat model with other local computer networks and to take further action on the basis of the received security alert and the new threat model; and the security agent modules are further configured to receive instruction, via the local centre node, from the security service network to evolve the behaviour of the security agent modules for detection of and/or responding to such security threats.

15. A non-transitory computer storage medium having stored thereon computer program code for implementing the threat detection method of claim 1.

* * * * *